United States Patent
Giacomini

(10) Patent No.: US 10,324,584 B2
(45) Date of Patent: Jun. 18, 2019

(54) TOUCH SCREEN DISPLAY HAVING AN EXTERNAL PHYSICAL ELEMENT FOR ASSOCIATION WITH SCREEN ICONS

(71) Applicant: WHIRLPOOL CORPORATION, Benton Harbor, MI (US)

(72) Inventor: Neomar Giacomini, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 448 days.

(21) Appl. No.: 14/965,138

(22) Filed: Dec. 10, 2015

(65) Prior Publication Data

US 2017/0168675 A1  Jun. 15, 2017

(51) Int. Cl.
| | |
|---|---|
| *G06F 3/048* | (2013.01) |
| *G06F 3/0481* | (2013.01) |
| *G06K 9/00* | (2006.01) |
| *G06F 3/0484* | (2013.01) |
| *G06F 3/0488* | (2013.01) |

(52) U.S. Cl.
CPC ...... *G06F 3/04817* (2013.01); *G06F 3/04845* (2013.01); *G06F 3/04883* (2013.01); *G06K 9/00013* (2013.01)

(58) Field of Classification Search
CPC .......... G06F 3/017; G06F 3/011; G06F 3/013; G06F 3/012; G06F 3/016; G06F 3/005; G06F 3/014; G06F 3/16; G06F 3/167; G06F 3/0304; G06F 3/04842; G06F 3/04883; G06F 3/04815; G06F 3/04845
See application file for complete search history.

(56) References Cited

U.S. PATENT DOCUMENTS

| | | | |
|---|---|---|---|
| 5,600,776 A * | 2/1997 | Johnson | G06F 9/4443 715/733 |
| 7,266,777 B2 | 9/2007 | Scott et al. | |
| 7,895,530 B2 | 2/2011 | Leavitt et al. | |
| 8,558,796 B2 * | 10/2013 | Giancarlo | G06F 1/1662 345/168 |
| 9,423,934 B2 * | 8/2016 | Kim | G06F 3/0481 |
| 2004/0036632 A1 * | 2/2004 | Ford | G06F 3/021 341/22 |
| 2005/0122313 A1 * | 6/2005 | Ashby | G06F 3/0219 345/168 |
| 2010/0216448 A1 * | 8/2010 | Jeon | G06F 3/04817 455/418 |
| 2012/0071989 A1 | 3/2012 | Pope et al. | |
| 2014/0181746 A1 * | 6/2014 | Lo | G06F 3/04886 715/835 |
| 2015/0135132 A1 * | 5/2015 | Josephson | G06F 3/0482 715/784 |
| 2015/0193982 A1 * | 7/2015 | Mihelich | H04W 4/026 345/633 |
| 2016/0196692 A1 * | 7/2016 | Kjallstrom | G06T 19/006 345/633 |

* cited by examiner

*Primary Examiner* — Di Xiao

(74) *Attorney, Agent, or Firm* — McGarry Bair PC

(57) ABSTRACT

A touch screen user interface display for an appliance has a touch screen with a plurality of icons. Each icon represents information that may be selectively invoked by touching the icon on the touch screen, wherein the icon may be moved by maintaining a touch of the icon and dragging it across the touch screen. The display also has a physical element having a portion partly overlapping the touch screen for association with screen icons.

13 Claims, 5 Drawing Sheets

TOUCH SCREEN DISPLAY HAVING AN EXTERNAL PHYSICAL ELEMENT FOR ASSOCIATION WITH SCREEN ICONS

BACKGROUND

A user interface is a device where interaction between users and machines occurs. The interaction may provide uni- or bi-directional communication between the user and the machine, for example, by allowing the user to control operation of the machine on the user's end, and by allowing the machine to provide feedback or information to the user. Increasingly, appliances provide a touch screen interface for user input and control. Touch screen displays can have a plurality of icons representing information.

BRIEF SUMMARY

The invention relates to a display for an appliance comprising a touch screen having a plurality of icons, with each icon representing information that may be selectively invoked by touching the icon on the touch screen. The icons may be moved by maintaining a touch of the icon and dragging them across the touch screen. There is also provided a physical element having a portion at least partly overlapping the touch screen, and a circuit coupled to at least one of the touch screen or the physical element and configured to associate an icon with the physical element when an icon is dragged on the touch screen to the portion of the physical element.

DETAILED DESCRIPTION

While the invention may be implemented in any apparatus or device having a user interface (UI) for providing interaction between a human user and a machine, it is currently exemplified to be implemented in a home appliance, non-limiting examples of which may include a dishwasher, laundry washer, refrigerator, or oven. Each appliance may comprise a UI coupled with a controller such that the interaction between the user and the appliance may define or perform a cycle of operation in response to the interaction. Other relevant applications include a touch screen on a remote control device.

Increasingly, control devices for appliances provide a touch screen interface for user input and appliance output. These touch screen displays can have a plurality of icons representing a variety of information. This variety of icons and their represented information and instructions can present a multiplication of choices for the user. Simplification may aid the user. Physical elements external to the touch screen are provided for association with touch screen control and to serve as a central control element. The icons can be moved across the screen and associated with the physical element in order to create combined functionalities, shortcuts, or cross-appliance commands.

Figure 1:
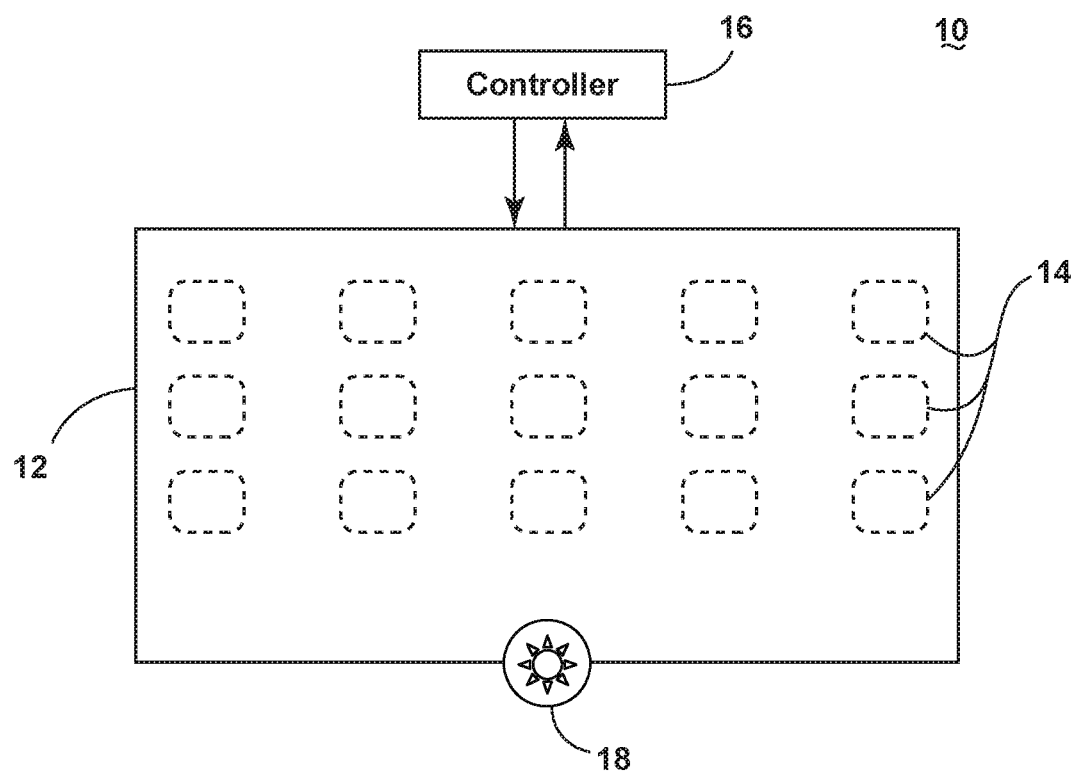
FIG. 1 is a schematic front view of a first embodiment of a user interface display.

FIG. 1 illustrates a schematic front view of a touch screen UI display 10 according to a first embodiment. The touch screen display 10 includes a touch screen 12 having a plurality of touch-sensitive inputs, or screen icons 14, to provide a user with an interface for initiating a device action. The touch screen 12 may be any of a variety of known types, including for example, a thin film transistor liquid crystal display with any of plurality of known technologies for recognizing touch, including but not limited to resistive sensing, capacitive sensing, projected capacitance, infrared, acoustic, or 3D. The touch key icons 14 are in electrical communication with a controller 16 by way of discrete touch-sensitive areas or buttons. The touch key icons 14 can act as switches or buttons for selecting an action or toggling a state of operation of the appliance. For the touch screen display 10 shown in FIG. 1, the touch key icons 14 are shown as an array of buttons distributed uniformly throughout the display 10. Touch key icons 14 may be distributed throughout the display 10, or grouped into one of more zones based on characteristics that may include functionality, ergonomics, or aesthetics. Other arrangements of touch key icons 14 are contemplated and are typically arranged based upon the system design requirements. The system design requirements may include limitations imposed by the deployed touch screen technology, the desired aesthetics of the graphic user interface, and the form factor of the touch screen 12.

The display 10 is provided with a physical element 18. The physical element 18 may be located at the lower edge of the display 10, external to the touch screen 12, or anywhere else on the display. Preferably, it is attached to the display 10 (here, the front). The physical element 18 can have a shape that is square, rectangular, circular, or any other shape. Non-limiting examples of implementation of the physical element 18 include a button or a center jewel control. The physical element 18 has a portion at least partly overlapping the touch screen 12. The physical element can, but is not required to, completely overlap with the touch screen 12.

Figure 2:
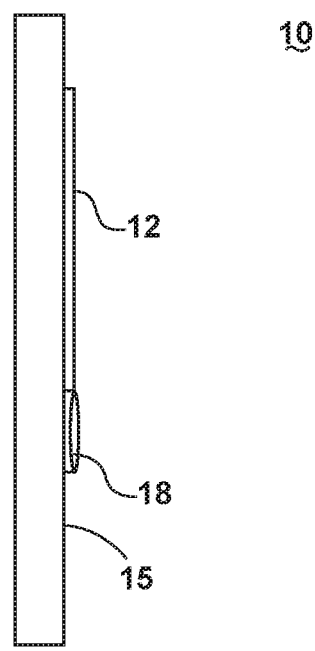
FIG. 2 is a side view of the display of FIG. 1.

FIG. 2 is a side view of the display 10 of FIG. 1. The display 10, comprising the touch screen 12 and the physical element 18, is located on the user interface front panel 15 of an appliance. The front panel 15 may be composed of glass, plastic, or other suitable material. The physical element 18 is shown at its location at the lower end of the touch screen 12, attached to the front surface of the touch screen 12 such that the physical element 18 at least partially overlaps the dimensions of the touch screen 12. While the touch screen 12 is illustrated here as being attached to or protruding from the front panel 15, it is also contemplated that the touch screen 12 could be located at the rear surface of the front panel 15, such as in the case of a capacitive touch screen. In such a case, the physical element 18 can still be suitably located as being attached to the front panel 15, provided that the physical element 18 at least partially overlaps the dimensions of the touch screen 12, even though the physical element 18 may not be directly attached to the front surface of the touch screen 12 itself.

An overview of the operation of the touch screen 12 will now be described. The touch key icons 14 may be disposed on the touch screen panel 12 in a discrete and static arrangement of electrodes. That is, each touch key icon 14 may be a single touch sensor, often called a touch switch, including one or more electrodes capable of outputting a signal indicative of a touch event but not a touch location. While the location of a touch switch may remain static, the function of the control may be flexibly programmable to invoke any number of functions on the electronic device. Alternatively, the touch screen panel 12 may have a virtual arrangement of touch keys. In other words, the touch screen panel 12 may include an array of interconnected electrode elements capable of outputting a signal indicative of both a touch event and touch location. In contrast to an array of touch switches, virtual touch controls may be dynamically sized and placed on a touch screen panel during operation of the touch screen interface.

An electronic device with a touch screen interface may include a touch screen panel 12 where some set of the touch key icons 14 are discrete touch switches and another set of the touch key icons 14 are virtual touch controls. The arrangement of the touch switches and the virtual touch controls may be completely integrated such that the user is presented with the impression of a single monolithic interface. Conversely, a more heterogeneous arrangement is contemplated where the touch switches are placed in proximity to the virtual touch controls, but the controls do not appear visually integrated. In this way, certain functions of the electronic device such as powering the device on or off or activating a cycle of operation may be activated by touching a touch switch and state-dependent functions may be accessible by a virtual touch control.

Regardless of the particular implementation of the touch key icons 14, the controller 16 in communication with the touch screen panel 12 and its associated touch key icons 14 may process the touch screen inputs, initiate an action to be taken by the appliance and provide a response to the touch screen panel 12. The feedback response may include a visual, audible or haptic acknowledgement of the user selection and an update of the touch screen interface display 10 based on the current state of the appliance. For example, when a user contacts the touch key icons 14, a signal is sent to the controller 16 to process the touch screen input as a user selection and, in response to the detecting of the user's touch, the controller 16 may communicate information to the user or initiate an action, such as a cycle of operation for an appliance.

A touch screen panel 12 may sense touch by one of a variety of different methods. Classified by the measured phenomenology indicative of a touch, types of touch screen panels include capacitive, resistive, surface acoustic wave, and infrared. In the case of the capacitive touch screen panel 12, touching the surface of the touch screen 12 results in a measurable distortion of the screen's electrostatic field, measurable as a change in capacitance.

The touch screen of the display of FIG. 1 has a plurality of icons 14. Each of these icons 14 represents information that may be selectively invoked by touching an icon 14 on the touch screen 12. This represented information can be, but is not limited to, a cycle command, selection of a portion of a cycle, a recipe, or a user "favorite" item or command. When an icon 14 is activated by user touch, it may initiate an action, open a different menu, etc.

Figure 3:
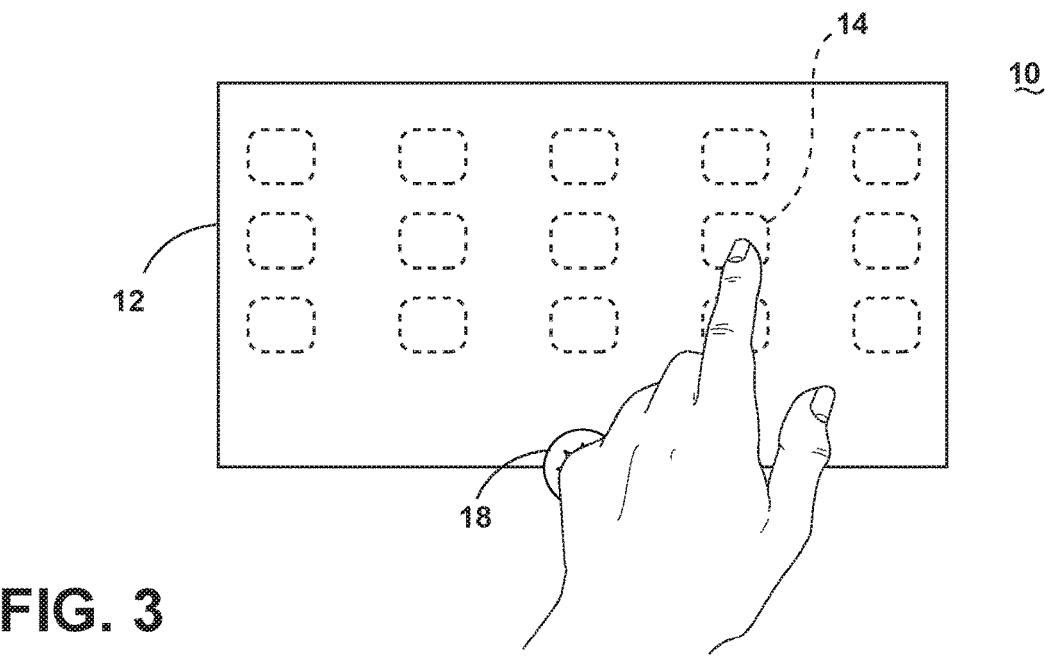
FIG. 3 is a front view of the display of FIG. 1 illustrating user selection of an icon.

FIG. 3 illustrates a user selecting or grabbing an icon 14 on the touch screen 12 of the display 10 of FIG. 1. When a user contacts an icon 14 on the touch screen 12, that icon 14 can be selected or grabbed when a predetermined touch pattern is executed by the user. Non-limiting examples of this touch pattern can include a tap, a double tap, or a prolonged hold (e.g. 2 seconds) on the icon 14. Once an icon 14 has been selected, a user is then able to move the icon 14 on the touch screen 12.

Figure 4:
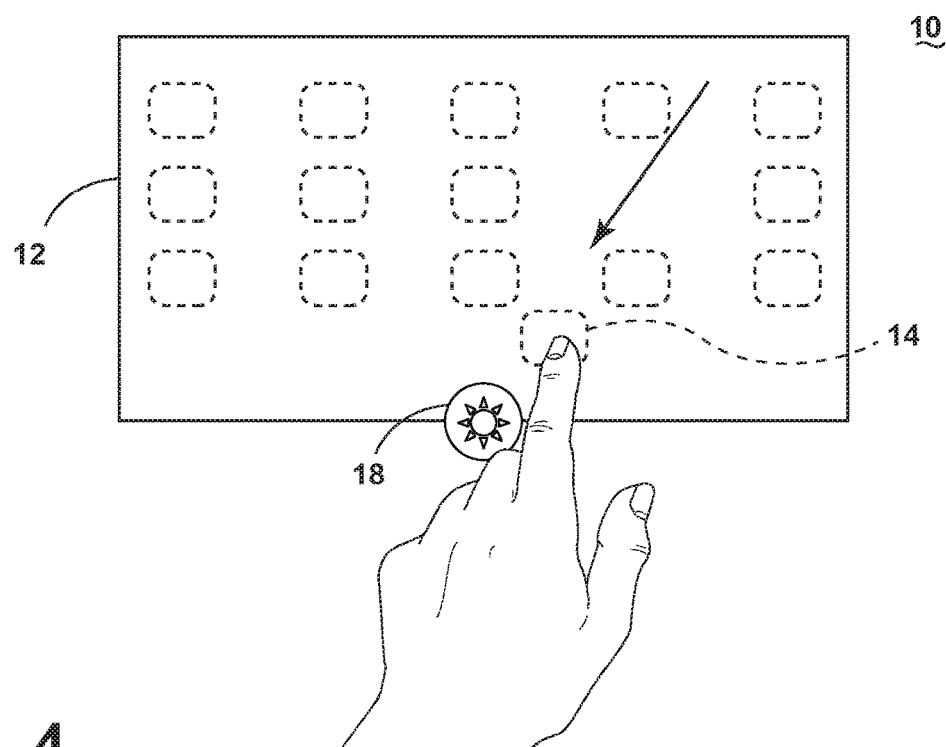
FIG. 4 is a front view of the display of FIG. 1 illustrating user dragging of the icon.

FIG. 4 illustrates a user moving a selected icon 14 on the touch screen 12 of the display 10 of FIG. 1. When a user has selected an icon 14 on the touch screen 12, the user can then drag the icon 14 towards the physical element 18 for association therewith. The user can move the icon 14 by maintaining a touch of the icon 14 and dragging it across the touch screen 12, as shown by the arrow illustrating the direction of movement in FIG. 4. The icon 14 can be moved either to a different location on the touch screen 12, or to the physical element 18.

Figure 5:
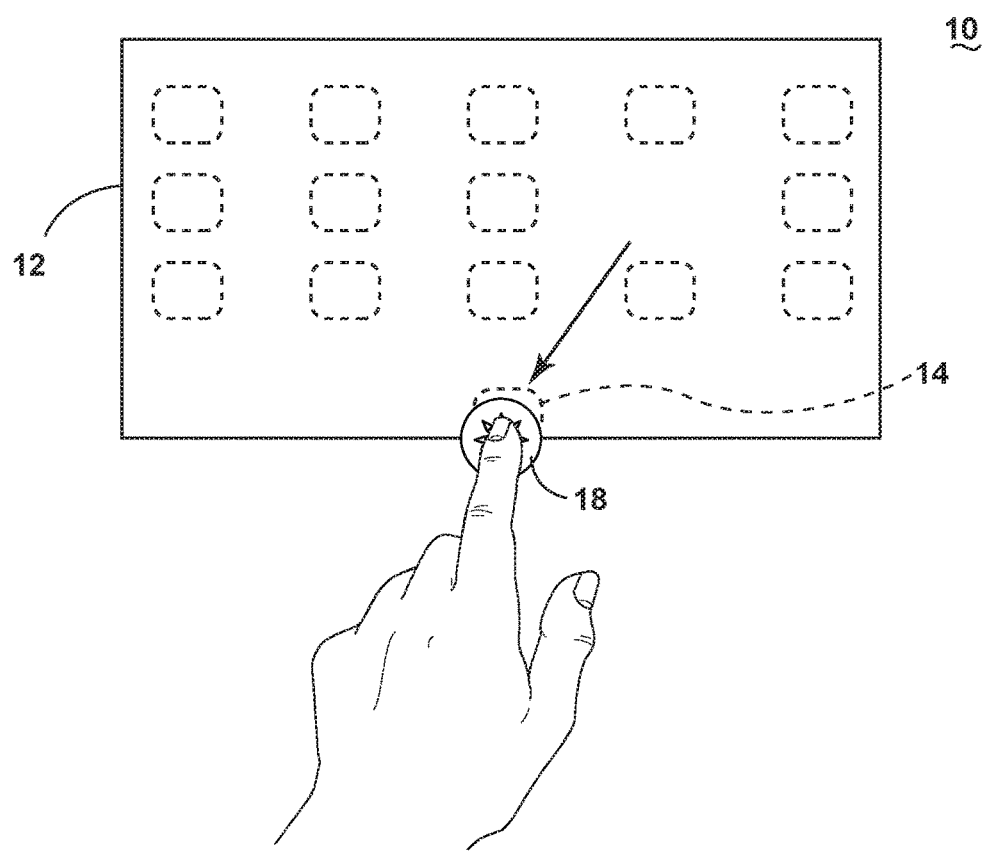
FIG. 5 is a front view of the display of FIG. 1 illustrating user association of the icon with a physical element.

FIG. 5 illustrates a user associating a selected icon 14 to the physical element 18 of the display 10 of FIG. 1. When a user drags an icon 14 to the portion of the touch screen 12 where the physical element 18 is located, the icon 14 can become associated with the physical element 18. This association can occur when a predetermined touch sequence or screen-offscreen gesture is executed by the user. Non-limiting examples of this predetermined touch sequence can include tapping at the location of the physical element 18, holding for a predetermined length of time (e.g. 2 seconds), or releasing the user's finger from the area of the touch screen 12 where the physical element 18 is located.

Figure 6:
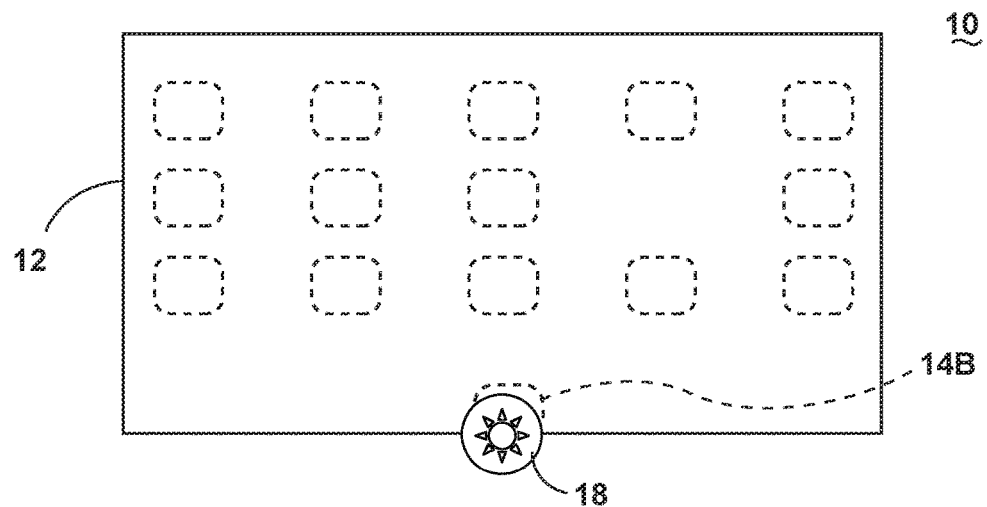
FIG. 6 is a front view of the display of FIG. 1 illustrating the icon in an associated position.

FIG. 6 illustrates an icon 14 in the association position 14B with the physical element 18. When an icon 14 has become associated with the physical element 18 by a circuit, the icon 14 will then have an appearance wherein the icon 14 is partially hidden behind the physical element 18 on the touch screen 12. This is known as the association position 14B. It is also contemplated that at least a portion of the physical element 18 is not opaque so that the user is enabled to view portions of the associated icons 14 beneath the physical element 18. It is further contemplated that at least a portion of the physical element 18 can be configured to change when an association of at least one icon 14 has occurred. For example, at least a portion of the physical element 18 could change color to indicate that an association currently exists or does not exist.

The circuit is coupled to at least one of the touch screen 12 or the physical element 18. The circuit can include a processor that is responsive to the touch screen 12 and to the physical element 18 and that detects a location of the icon 14 relative to the location of the physical element 18. The processor may be in the controller 16 or it may be dedicated elsewhere, so long as it is coupled to the display to sense signals therefrom. The circuit may be a dedicated hard wired electrical circuit coupled to the touch screen and configured to create the association. The circuit may include a combination of connections among or between any two of the touch screen 12, the physical element 18, and the controller 16 wherein signals indicative of the association are generated. The association may occur when the circuit detects that a portion of the icon 14 and a portion of the physical element 18 occupy the same location, whereupon the circuit assigns the functionalities of the icon 14 to the physical element 18. When an association occurs and at least one icon 14 is in the association position 14B, the physical element 18 is configured to adopt new functionalities. Non-limiting examples of these new functionalities include at least one of a new user-built cycle, a given special configuration for a cycle, a shortcut, a recipe, or a command including more than one appliance.

Figure 7:
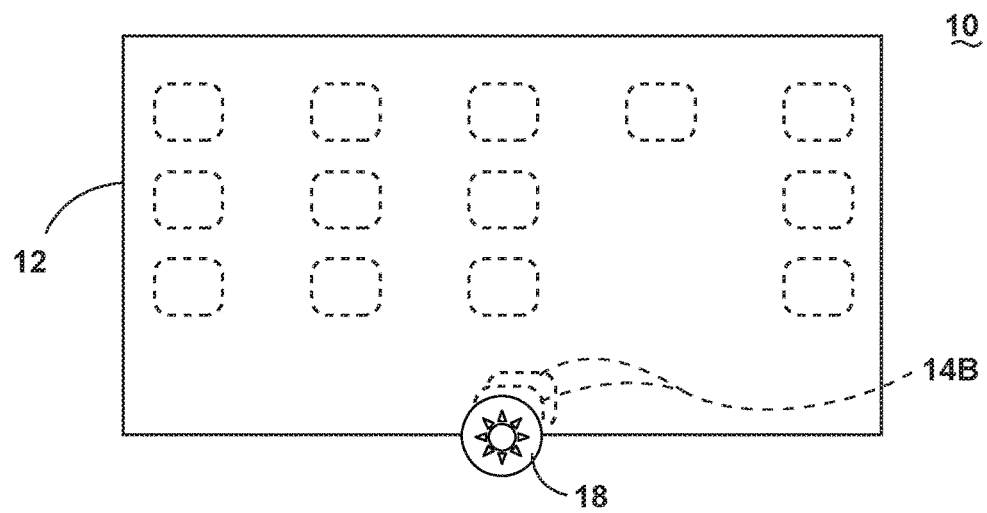
FIG. 7 is a front view of the display of FIG. 1 illustrating multiple icons in the associated position.

FIG. 7 illustrates multiple icons 14 in the association position 14B with the physical element 18. When multiple icons 14 have become associated with the physical element 18 by the circuit, the multiple icons 14 will then have an appearance of being partially hidden behind the physical element 18 on the touch screen 12 in the association position 14B. When multiple icons 14 are associated with the physical element 18 at the same time, the information represented by the multiple icons 14 can be combined to form a recipe, process, steps, custom cycle, etc. The physical element 18 can be configured to "explode" multiple associated icons 14 from the physical element 18 when the user actuates the physical element 18 with a predetermined touch action, which can include, but is not limited to, a user hold on the physical element 18 for a set time period. In this way, after the user executes the predetermined touch action, the multiple associated icons 14 are exploded from the physical element 18 such that they become more easily visible and distinguishable to the user.

Figure 8:
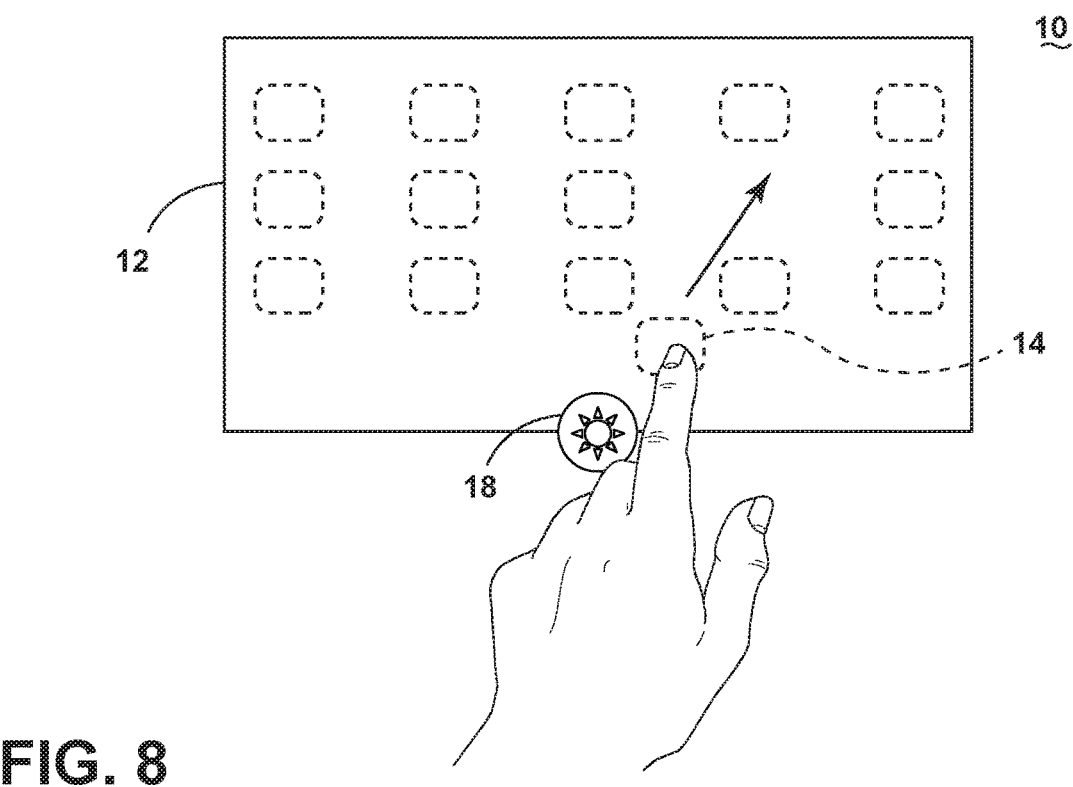
FIG. 8 is a front view of the display of FIG. 1 illustrating user dragging of the icon being disassociated from the physical element.

FIG. 8 illustrates a user disassociating a selected icon 14 from the physical element 18 of the display 10 of FIG. 1. The association capability of the invention also provides for the disassociation of icons 14 from the physical element 18 of the touch screen 12 by the circuit that is configured to disassociate an icon 14 from the physical element 18. When a user drags an icon 14 away from the portion of the touch screen 12 where the physical element 18 is located, the icon 14 can become disassociated from the physical element 18. The icon 14 to be disassociated from the physical element 18 is selected by a predetermined touch sequence, or offscreen-screen gesture, that is executed by the user. The icon 14 is then dragged on the touch screen 12 away from the portion of the physical element 18 to an intended location on the touch screen 12, and assigned to the new location on the touch screen 12, by a predetermined touch sequence as is used to associate an icon 14 to the physical element 18. As such, the process of disassociating an icon 14 from the physical element 18 is identical to the association process, in reverse. Non-limiting examples of this predetermined touch sequence can include tapping at the location of the icon 14, holding for a predetermined length of time (e.g. 2 seconds), or releasing the user's finger from the area of the touch screen 12 where the icon 14 is to be newly located.

In a further embodiment of the invention, the physical element 18 can also be configured to recognize at least one fingerprint of at least one user. The physical element 18 can include fingerprint recognition capability in combination with touch capability, or can possess either of these capabilities on their own. In an embodiment in which the physical element 18 is configured to recognize at least one fingerprint of at least one user, the physical element 18 can create associations for different users.

For example, if there are three different regular users of the appliance, the physical element 18 can recognize and differentiate between the three users' fingerprints. Each of the users can have their own functions associated to the physical element 18, so the physical element 18 will have three different functions that are each accessible only when that given user's fingerprint is recognized, ensuring security and privacy. This feature can also prevent unauthorized users or children from activating cycles on an appliance, as their fingerprint would not be recognized and given access by the physical element 18.

Alternatively, the user can have an option to allow other users to access their associations when privacy is not required. The physical element 18 and the associated circuit can be capable of storing a multitude of associations amongst a multitude of users. For example, if the circuit were capable of storing thirty associations, a household with six identified users could have five associations for each user. Furthermore, each user could have each of their associations set to correspond with each of their five fingerprints such that a press of a specific finger to the physical element 18 would automatically select the intended association. In this way, the user would not have to first be identified by the physical element 18, and then select from their five corresponding associations.

The embodiments described herein illustrate the advantages of having a physical element in conjunction with a touch screen such that screen icons can be associated to the physical element. The invention allows for a great degree of user personalization, even in situations with multiple users. The invention also simplifies operation of the appliance by allowing shortcuts to be created, multiple icons to be combined into a recipe or custom cycle, or commands to be associated amongst multiple appliances.

In this specification and the appended claims, the singular forms "a," "an" and "the" do not exclude the plural reference unless the context clearly dictates otherwise. Further, conjunctions such as "and," "or," and "and/or" used in this specification and the appended claims are inclusive unless the context clearly dictates otherwise. For example, "A and/or B" includes A alone, B alone, and A with B; "A or B" includes A with B, and "A and B" includes A alone, and B alone. Further still, connecting lines or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Moreover, terms such as, but not limited to, generally, approximately, substantially, etc. are used herein to indicate that a precise value, shape or amount is not required, need not be specified, etc. For example, a first value being approximately a second value means that from a practical implementation perspective they can be considered as if equal. As used herein, such terms will have ready and instant meaning to one of ordinary skill in the art While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A display for an appliance comprising:
  a touch screen having a plurality of touch input icons, each touch input icon representing information and having a functionality that may be selectively invoked by touching the touch input icon on the touch screen, wherein the touch input icon may be moved by maintaining a touch of the touch input icon and dragging it across the touch screen;
  a physical element comprising a button or jewel attached to the touch screen and having a portion at least partly overlapping the touch screen, the physical element provided for association with control of the touch screen and configured to serve as a central control element; and a circuit coupled to at least one of the touch screen or the physical element, configured to associate the touch input icon with the physical element when the touch input icon is dragged on the touch screen to the portion of the physical element that is at least partly overlapping the touch screen such that the circuit assigns the functionality of the touch input icon to the physical element;

wherein the touch input icon associated with the physical element has an appearance emulating being partially hidden behind the physical element on the touch screen, and further wherein the touch input icon having the appearance emulating being partially hidden behind the physical element indicates that the touch input icon has become associated with the physical element and that the physical element has adopted the functionality of the touch input icon.

2. A display for an appliance comprising:

a touch screen having a plurality of touch input icons, each touch input icon representing information and having a functionality that may be selectively invoked by touching the touch input icon on the touch screen, wherein the touch input icon may be moved by maintaining a touch of the touch input icon and dragging it across the touch screen;

a physical element comprising a button or jewel attached to the touch screen and having a portion at least partly overlapping the touch screen; and a circuit coupled to at least one of the touch screen or the physical element, configured to associate the touch input icon with the physical element when the touch input icon is dragged on the touch screen to the portion of the physical element that is at least partly overlapping the touch screen such that the circuit assigns the functionality of the touch input icon to the physical element;

wherein the touch input icon associated with the physical element has an appearance emulating being partially hidden behind the physical element on the touch screen, and further wherein the touch input icon having the appearance emulating being partially hidden behind the physical element indicates that the touch input icon has become associated with the physical element and that the physical element has adopted the functionality of the touch input icon.

3. The display of claim 2 wherein at least a portion of the physical element is not opaque to enable viewing of portions of the associated touch input icon.

4. The display of claim 2 wherein the circuit associates multiple touch input icons with the physical element at the same time.

5. The display of claim 4 wherein the physical element is configured to explode multiple associated touch input icons from the physical element when the physical element is actuated with a predetermined touch action.

6. The display of claim 5 wherein the predetermined touch action is a hold for a set time period.

7. The display of claim 2 wherein the circuit is configured to disassociate the touch input icon from the physical element when the touch input icon is dragged on the touch screen away from the portion of the physical element that is at least partly overlapping the touch screen.

8. The display of claim 2 wherein the physical element is configured to adopt new functionalities after the association occurs.

9. The display of claim 8 wherein the new functionalities include at least one of a new user built cycle, a given special configuration for a cycle, a shortcut, a recipe, or a command including more than one appliance.

10. The display of claim 2 wherein the physical element is configured to recognize at least one fingerprint.

11. The display of claim 2 wherein the circuit includes a processor that is responsive to the touch screen and to the physical element and is configured to detect a location of the touch input icon relative to the physical element.

12. The display of claim 2 wherein at least a portion of the physical element is not opaque to enable viewing portions of associated touch input icons beneath the physical element.

13. The display of claim 2 wherein at least a portion of the physical element is configured to change based on the association.

* * * * *